United States Patent Office 3,437,722
Patented Apr. 8, 1969

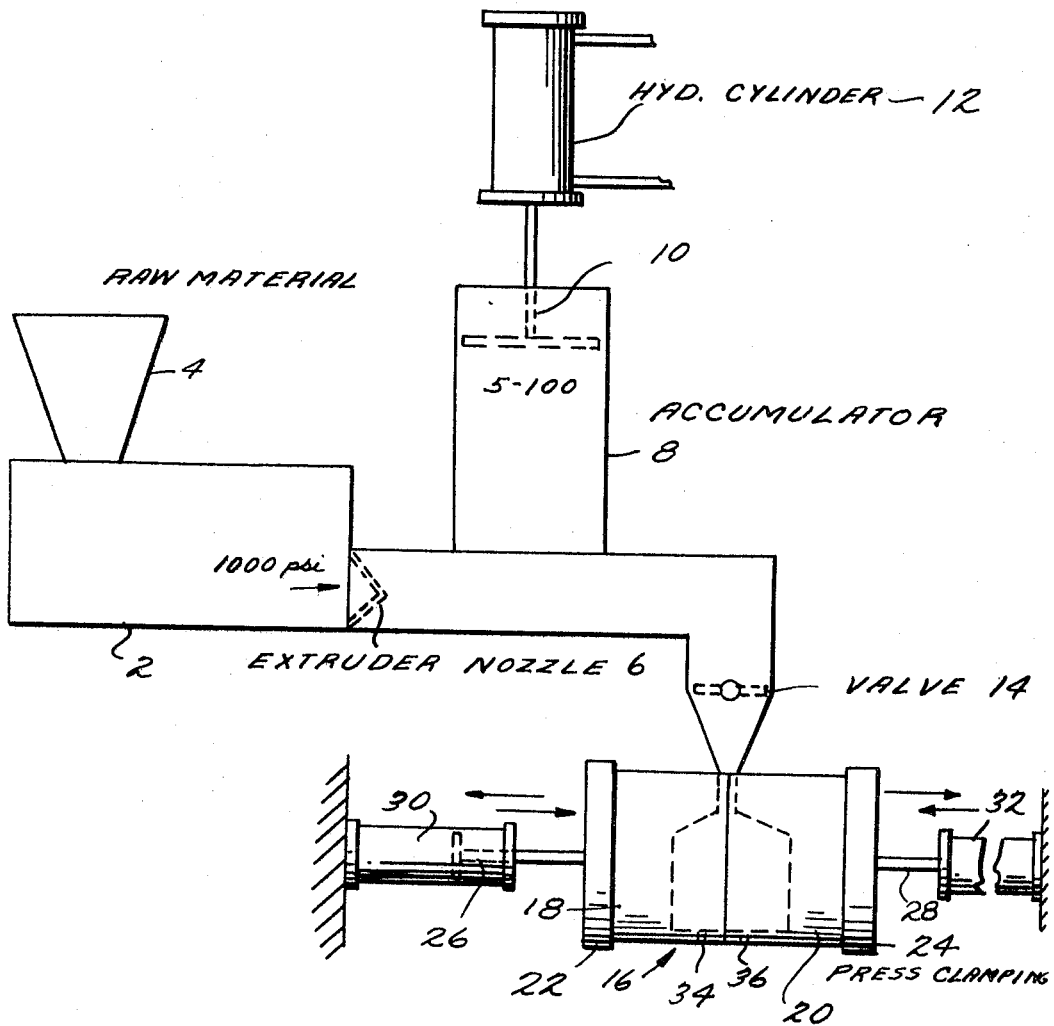

3,437,722
TRANSFER MOLDING OF FOAM
Edward W. Cronin, Wilmington, and Walter O. Weber, Newark, Del.; said Cronin assignor to Hercules Incorporated, a corporation of Delaware, and said Weber, assignor to Haveg Industries, Inc., Wilmington, Del., a corporation of Delaware
Filed Apr. 27, 1965, Ser. No. 451,202
Int. Cl. B29d 27/04
U.S. Cl. 264—48          13 Claims

ABSTRACT OF THE DISCLOSURE

A hot, foamable thermoplastic polymer is extruded at a first pressure, allowed to foam and accumulate in a chamber at a second pressure which is lower than the first pressure. Then the foamed polymer is transferred at a pressure less than the first pressure into a mold and formed into a molded article. Preferably, the mold walls are cooled so that a skin of unfoamed material is formed on the article.

---

The present invention relates to molding of thermoplastic polymers.

It has previously been proposed to injection mold plastics by directly forcing into an injection mold a foamable mass and allowing it to expand and foam in the injection mold. Such processes involve the use of high pressures in the injection molding step. Also the overall cycle time is slower than desired.

It is an object of the present invention to prepare foamed, injection molded articles.

Another object is to reduce the overall time in the injection molding cycle.

A further object is to develop an injection molding process which permits the use of low cost molds and low clamping pressures for holding molds.

An additional object is to form a foamed, injection molded object having an unfoamed, impervious skin integral with the foam portion of said object.

Yet another object is to be able to prepare foamed, injection molded articles of lower density.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by extruding foaming thermoplastic polymer into an accumulator and then transfer molding the foamed thermoplastic under low pressure using conventional injectors such as a ram injector or a screw injector such as a reciprocating screw injector.

While the transfer pressure can be as much as 500 p.s.i., one of the advantages of the present invention is that normally much lower pressures are employed, preferably 5 to 250 p.s.i.

It will be realized of course that the pressures in the present specification are necessarily gauge pressures, i.e. p.s.i. since a positive pressure above atmospheric is required for the transfer.

The mold is normally cold, e.g. it can be at room temperature (about 20° C.) or below, e.g. —20° C. or it can have a temperature of up to +60° C. The mold can be cooled by external means, if desired, e.g. by passing cooling fluid such as water through conduits in the mold.

The process of the present invention has been found to be more efficient than direct injection of foamable material into the mold. Furthermore, the use of the accumulator permits the formation of lower density articles using lower operating pressures.

As indicated, the mold itself is normally cold, i.e. well below the softening temperature of the thermoplastic resin. An impervious, non-porous skin is formed because as the warm foam enters the mold cavity it touches the cold cavity wall. The foam rides on the wall and starts to harden as it cools. The hardened portion stays adjacent to the wall and does not flow as well as the remainder of the still warm foam. Turbulence is thus set up creating a shearing action as the warm foam passes the mold wall because part of the foam is not moving or is moving much more slowly than the remainder. The gas bubbles act as a plasticizer aiding in the flow of the plastic. The termoplastic foam is in the nature of an elastic, porous or gas trapped, soft, bubbly material. The turbulence breaks the bubbles at and near the mold surface and releases the gas which is then removed through the vents which are present in the injection mold walls. As a result the material adjacent the walls is densified and forms portion or core. Actually there is a gradation in foam density over a relatively small area between the skin and the main body of the foam. The skin increases the strength of the finished article.

The foam portion can have a density of 5 to 90% of the density of the unfoamed thermoplastic material. The density of the foam more usually is 10 to 80% of the density of the unfoamed thermoplastic and preferably is not over 60% of the density of the unfoamed thermoplastic.

By the process of the present invention large articles can be injection molded in a molding cycle of 45 seconds while smaller articles can be molded in even shorter periods of time.

The non-porous skin formed is normally 2 to 20% of the thickness of the foamed article and the skin can be 0.001 to 0.100 inch thick.

The process of the invention can be used to mold cups, bottles and other containers, bottle closures, shoe heels, shocks absorbers, buttons, window frames, water level indicator floats, dolls, toys, bowling balls, bowling pins, buoys, soft drink cases, beach balls, handles, tools, conventional pigments, fillers (including fibrous fillers), stabilizers and other additives can be included in the foamable compositions.

In injection molding articles between inner and outer cold mold sections using the process of the present invention there will be formed a foamed plastic core integral with inner and outer impervious, non-porous, unfoamed skins. The two skins can be of equal thickness or one can be thicker than the other, e.g. by cooling one mold section more than the other.

In making the skinned foam articles of the present invention there can be employed many different types of foamed plastics.

When employing polystyrene there can be employed normal crystal grade polystyrene or high impact polystyrene or a mixture containing 5 to 95% normal crystal grade polystyrene and the balance high impact polystyrenes. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene poymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

Other siutable thermoplastic resins and polymers include chlorinated rubber, cellulose ethers and esters, e.g., ethyl cellulose, cellulose acetate, cellulose acetate-butyrate, bituminous materias, e.g., asphalt and coal tar pitch, paraffin wax, homopolymers and interpolymers of monomeric compounds containing the $CH_2\text{=}C$ grouping, such as olefins, e.g., ethylene, propylene, isobutylene, butene-1, vinyl halides, e.g., vinyl chloride and vinyl fluoride, vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluorethylene, tetrafluorethylene, hexafluoropropylene, unsaturated carboxylic acids and derivatives thereof, e.g., acrylic acid, methacrylic acid, methyl acrylate, methyl alpha chloracrylate, ethyl acrylate, methyl methacrylate, acrylamide, acrylonitrile, methacrylonitrile, and interpolymers of the above-mentioned vinylidine monomers with alpha, beta-unsaturated polycarboxylic acids and derivatives thereof, e.g., maleic anhydride, diethyl maleate, dibutyl fumarate, diallyl maleate, dipropyl maleate, polyolefin, monopolymers, copolymers and terpolymers, etc. A preferred class of materials with which optimum results are obtained are rigid, relatively nonelastic, thermoplastic resins such as homopolymers and interpolymers of vinyl chloride, e.g., polyvinyl chloride, vinyl chloride-vinyl acetate copolymer (87:13), vinyl chloride-acrylonitrilecopolymer (80:20); homopolymers of vinyidene aromatic hydrocarbons and ring halogenated derivatives thereof, e.g. styrene, o-chlorostyrene, p-chlorostyrene, 2,5-dichlorostyrene, 2,4-dichlorostyrene, p-methylstyrene, p-ethylstyrene, alphamethylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Additional suitable thermoplastic resins include polycarbonates, e.g., the polymer from bisphenol A and diphenyl carbonate; polyoxymethylene (Delrin), oxymethylene-alkylene oxide copolymers, e.g., oxymethylene - ethylene oxide (95:5), polyurethanes, e.g., prepolymers from toluene diisocyanate and polypropylene glycol molecular weight 2025; or glycerine-propylene adduct molecular weight 3000 or butanediol 1,4-adipic acid polyester; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylontrile, and 20 to 60% styrene.

The present invention is of particular value in preparing foamed articles from polyethylene (of high density, e.g., 0.960, medium density, e.g., 0.935 or low density, e.g., 0.914), polypropylene, copolymers of ethylene and propylene (e.g., 50:50 copolymer, 60:40 copolymer and 20:80 copolymer), regular or high impact polystyrene, acrylonitrile-butadiene-styrene terpolymer, polyvinyl chloride (preferably rigid polyvinyl choride), copolymers of ethylene with minor amounts of alpha olefins having 4 to 10 carbon atoms such as butene-1 (e.g., 90:10 and 97.5:2.5) or octene-1 (96:4); terpolymers of ethylene, propylene and up to 5% of a nonconjugated polyolefin such as alloocimene, pentadiene-1,4 and dicyclopentadiene, e.g., a terpolymer of 60% ethylene, 39% propylene and 1% dicyclopentadiene or pentadiene-1,4.

There can also be prepared foamed articles from fluorocarbon polymers such as, polyhexafluoropropylene and tetrafluoroethylene-hexafluoropropylene copolymer (e.g., 50:50).

In forming the foamed plastic, there is preferably utilized a nucleating agent, e.g., in an amount of from 0.02 to 10%, preferably 0.4 to 5% of the weight of the polymer.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid, glutaric acid and phthalic acid. In places of the anhydrous acids or salts there can be used the solid hydrates, e.g., oxalic acid hydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

One mode of incorporating the foaming agent into the polymer is by premixing the pelletized, solid, thermoplastic polymer, e.g., high impact styrene polymer, with a minor amount of an absorbent having absorbed thereon a volatile liquid, (i.e., the foaming agent) which is nonreactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 150° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, dichloro-difluoromethane, perchloroethylene, dichlorotetrafluoroethane, isopropyl chloride, carbon tetrachloride, monochlorotrifluoroethylene, propionaldehyde, diisopropyl ether, dichloro-difluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular polymer employed. Usually, the amount of volatile liquid will be 0.1 to 15% by weight of the polymer to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of a screw extruder.

Instead of absorbing the volatile liquid on a filler, there can be employed conventional expansible thermoplastic materials such as expansible polystyrene containing 1 to 9% of one of the volatile liquids, e.g., Dow-Pelespan 101 (expansible polystyrene beads containing 6% pentane).

Various suitable chemical foaming or blowing agents and their gas release (i.e. decomposition) temperatures are set forth in the following table:

TABLE

| Foaming agent: | Gas release temperature, ° C. |
| --- | --- |
| Azobisisobutyronitrile | 115 |
| N,N'-dimethyl-N,N'-dinitrosoterephthalamide | 105 |
| p,p'-Oxybis(benzenesulfonyl hydrazide) | 150 |
| Dinitrosopentamethylenetetramine | 185 |
| Azodicarbonamide | 200 |
| Sodium bicarbonate citric acid (4:3) | 140 |
| Urea-biuret (33:67) | 135 |
| Diazoaminobenzene | 100 |
| 1,6-di-n-decyl azobisformamide | 145 |
| 1,6-di-phenyl azobisformamide | 176 |
| Diphenyl 4,4'-di(sulfonyl azide) | 145 |
| p,p - Oxybis(N - nitroso - N - methyl benzenesulfonamide) | 130 |
| Tetramethylene dinitrosodimethyl urethane | 125 |
| p,p-Oxybis(benzenesulfonyl semicarbazide) | 210 |
| Benzene sulfonic acid hydrazide | 104 |
| B-naphthalene sulfonic acid hydrazide | 138 |
| Diphenyl sulfone-3,3'-disulfonyl hydrazide | 150 |
| Benzene 1,3-disulfonic acid dihydrazide | 145 |
| Benzene sulfonic acid N-phenyl hydrazide | 146 |
| 95% sodium bicarbonate and 5% melamine | 140 |
| Barium azodicarboxylate | 250 |

Additionally there can be used materials such as trihydrazinotriazine, sodium bicarbonate, benzene sulfonyl hydrazine, ammonium carbonate, ammonium bicarbonate and potassium bicarbonate.

The invention will be understood best in connection with the drawings wherein:

The figure is a somewhat schematic representation of one form of suitable apparatus for carrying out the invention.

Referring more specifically to the drawings, there is provided a screw extruder 2. Into the hopper 4 of the extruder there is added the thermoplastic foamable composition (e.g. a mixture of polystyrene with a blowing agent such as 1.3% of critic acid and 1.7% sodium bicarbonate and 0.2% of Bayol 35 based on the polystyrene). The solid mixture is heated under high pressure in the extruder to above the decomposition temperature of the blowing agent, e.g. to 150° C., and the foamable mixture under high pressure, e.g. 1000 p.s.i. (although it can be much more, e.g. 2500 p.s.i. or 5000 p.s.i.) is passed through nozzle 6 into accumulator (or transfer pot) 8. The foamable composition then commences to foam in the accumulator under a pressure of 5 to 250 p.s.i., e.g. 50 p.s.i.

In place of nozzle 6 the extruder can be provided with a screen pack or other device which permits the foamable composition to enter the accumulator. A piston 10 is slidably located between accumulator 8 and hydraulic cylinder 12, as the foamable composition expands in the accumulator it forces the piston to go further up into the hydraulic cylinder. In this phase of the operation cycle valve 14 is closed. There is also provided a split injection mold 16 composed of metal mold halves 18 and 20 which are attached to press clamping platens 22 and 24. The platens are moved in the direction of the arrows with the aid of pistons 26 and 28 operating in hydraulic cylinders 30 and 32 to open and close the mold halves 18 and 20. The mold also has conventional vents 34 and 36 which aid in the removal of the gases released by the breaking of the bubbles adjacent the mold walls. The mold walls are at lower temperature than the foamed material entering the mold from the accumulator, e.g. 175° C. in the case of polypropylene.

When sufficient foamed plastic has formed in accumulator 8 mold halves 18 and 20 are brought together, valve 14 is opened and a low pressure, e.g. 100 p.s.i. is applied from the hydraulic cylinder via piston 10 to force foamed plastic into the mold and form a container having the shape indicated by the dotted lines in the mold. Since the foamable plastic is being extruded at a much greater pressure from extruder nozzle 6 none of the foamed plastic is forced back into the extruder but instead it is forced into the injection mold. After formation of the container the mold halves are opened and the container removed.

In one specific example in which polypropylene containing 1% of azobisisobutyronitrile was extruded at a pressure of 1000 p.s.i. and a temperature of 182° C. the temperature of the foamed polypropylene in the accumulator at the time of injection of the foamed polypropylene into the mold was 175° C. The mold walls were at 20° C. The container had a wall thickness of 60 mils, the skin being 8 mils thick and the foamed portion 52 mils thick. The transfer molded foam had a density of 35 lbs./cu. ft. while the skin had a density of 52 lbs./cu. ft.

In another example there was produced an injection molded foamed polypropylene heel having an unfoamed skin with a density of 56 lbs./cu. ft. (The same as the starting polypropylene) while the foamed portion of the heel (90% of the total thickness) had a density of 45.6 lbs./cu. ft.

In a third specific example there was employed Pelespan 101 (polystyrene containing 6% pentane).

The pressure at the extruder die was 1000 p.s.i. and the extrusion temperature was 160° C. The polystyrene was allowed to foam in the accumulator and was then injection molded into a cup at a pressure of 100 p.s.i. The temperature of the foamed polystyrene going into the mold was about 150° C. and the mold was cooled to 10° C. by cooling water running through ducts in the mold. In this case the foamed polystyrene was forced into a cup shaped channel in the mold so that both the inner and outer surfaces of the cup as it was being formed were cooled by the mold. Thus there was formed a foamed polystyrene cup having inner and outer external skins integral with the foamed core. The cup wall had a thickness of 50 mils, composed of a 4 mil thick impervious, unfoamed outer skin, a 4 mil thick impervious, unfoamed inner skin, and a 42 mil thick foamed core. The foamed core had a density of 30 lbs./cu. ft. and the skin a density of slightly over 60 lbs./cu. ft.

In place of the polystyrene composition employed in Example 3 there also was used a mixture of 50 parts of regular crystal grade polystyrene 50 parts of high impact polystyrene (polystyrene containing 10% of styrene-butadiene rubbery copolymer) 1.3 parts of citric acid, 1.7 parts of sodium bicarbonate and 0.2 part of Bayol 35 to produce a similar cup having better impact strength.

In the claims the term polymer is used in its normal sense to include both homopolymers and copolymers.

What is claimed is:

1. A process of molding a foamed thermoplastic polymer composition comprising extruding a hot foamable thermoplastic polymer into an accumulation zone outside a mold, said accumulation zone being at a pressure allowing the hot foamable polymer to foam, and transferring the accumulated foamed polymer into the mold to form a molded article.

2. A process according to claim 1 wherein said pressure is above-atmospheric pressure but not over 250 p.s.i.

3. A process according to claim 1 wherein said foamed composition is in warm condition and is forced into a substantially cooler mold to form a foamed article having an impervious, unfoamed skin of said composition integral with the foam position of the article.

4. A process according to claim 3 wherein the pressure is above atmospheric pressure but not over 250 p.s.i. and said thermoplastic composition is selected from the group consisting of styrene polymers, ethylene polymers, propylene polymers and vinyl chloride polymers.

5. A process of molding a foamed thermoplastic polymer composition comprising extruding a hot foamable thermoplastic polymer composition at a first pressure which is substantial, allowing the hot foamable polymer to foam and accumulate at a second pressure much lower than said first pressure and then transferring at a pressure much less than said first pressure the thus foamed and accumulated composition into a mold to form a molded article.

6. A process according to claim 5 wherein the first pressure is at least twice the second pressure and transfer pressure.

7. A process according to claim 5 wherein the extrusion pressure is at least 1000 p.s.i. and the accumulation and transfer pressure is a superatmospheric pressure from 5 to 500 p.s.i.

8. A process according to claim 7 wherein the accumulation and transfer pressure is a superatmospheric pressure from 5 to 250 p.s.i.

9. A process according to claim 5 wherein the wall surface of the mold has a temperature substantially less than that of the hot foamed composition transferred into the mold and the bubbles in the foamed composition adjacent said wall surface are broken and there is formed an impervious unfoamed skin of said composition adjacent said wall surface, said skin being integral with but of lesser thickness than the foamed portion of the molded article produced.

10. A process according to claim 9 wherein said composition is injected into said mold at a superatmospheric pressure of 5 to 250 p.si.

11. A process according to claim 10 wherein said polymer is a styrene polymer.

12. A process according to claim 7 wherein said polymer is a propylene polymer.

13. A process according to claim 10 wherein said polymer is an ethylene polymer.

References Cited

UNITED STATES PATENTS

| | | | |
|---|---|---|---|
| 3,225,127 | 12/1965 | Scott | 264—54 |
| 3,300,554 | 1/1967 | Bachus | 264—47 |
| 3,058,161 | 10/1962 | Beyer et al. | 264—47 |
| 3,162,703 | 12/1964 | Eyles | 264—51 |
| 3,211,605 | 10/1965 | Spaak et al. | 264—51 XR |
| 3,218,375 | 11/1965 | Hardwick | 264—48 XR |
| 3,268,636 | 8/1966 | Angell | 264—48 XR |

DONALD J. ARNOLD, *Primary Examiner.*

PHILIP E. ANDERSON, *Assistant Examiner.*